Figure 1:
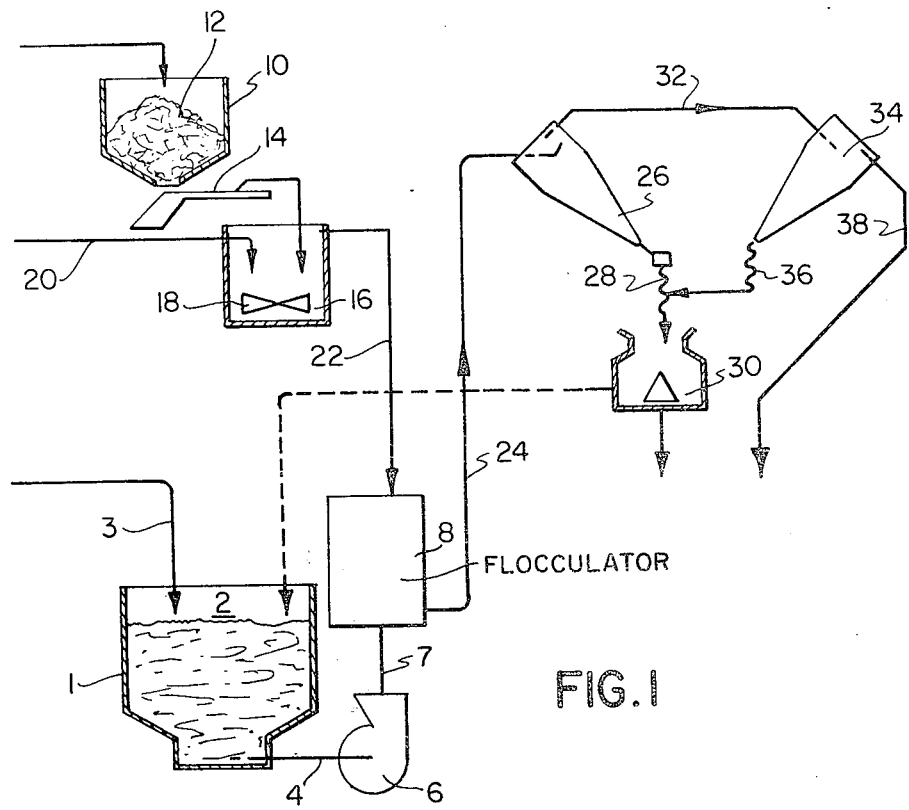

# United States Patent [19]

Visman et al.

[11] 3,929,633
[45] Dec. 30, 1975

[54] METHOD AND APPARATUS FOR CENTRIFUGALLY SEPARATING FINELY DIVIDED SOLIDS FROM AQUEOUS SUSPENSIONS THEREOF

[75] Inventors: Jan Visman, Sydney, Canada; Hassan A. Hamza, Cairo, Egypt

[73] Assignee: Canadian Patents and Development Limited, Ottawa, Canada

[22] Filed: Feb. 28, 1974

[21] Appl. No.: 446,903

[30] Foreign Application Priority Data
Mar. 29, 1973 Canada.............................. 167482

[52] U.S. Cl. .................... 210/49; 210/84; 210/209; 210/512; 259/4; 261/76; 261/DIG. 75
[51] Int. Cl.²......................................... B01D 21/26
[58] Field of Search ............ 210/51, 52, 54, 78, 84, 210/199, 202, 207, 209, 259, 294, 512, 512 M, 59, 49; 209/144, 211; 261/76, DIG. 75; 259/4, DIG. 30

[56] References Cited
UNITED STATES PATENTS
3,572,500    3/1971    Kouloheris............................ 209/5

3,794,299    2/1974    Wagner et al. ........................ 259/4

*Primary Examiner*—Thomas G. Wyse
*Assistant Examiner*—F. F. Calvetti
*Attorney, Agent, or Firm*—Francis W. Lemon

[57] ABSTRACT

Finely divided solids are centrifugally separated from an aqueous suspension thereof by forming a flowing sheet of the aqueous suspension, preferably a hollow swirling cone of the aqueous suspension, spraying a solution of a water soluble, high molecular weight, long chain flocculant substantially at right angles into a side face of the flowing sheet so that flocculant is absorbed into wetted surfaces of the finely divided solids, without totally wrapping individual finely divided solids by the flocculant and without entrapping finely divided solids by premature bridging, flocculating the finely divided solids to form dense, strong flocs predominantly larger than the "size cutpoint" of a cyclone separator, and then centrifugally separating a major portion of the dense, strong flocs from the aqueous medium by means of that cyclone separator.

5 Claims, 4 Drawing Figures

METHOD AND APPARATUS FOR CENTRIFUGALLY SEPARATING FINELY DIVIDED SOLIDS FROM AQUEOUS SUSPENSIONS THEREOF

This invention relates to a method and apparatus for centrifugally separating finely divided solids from aqueous suspensions thereof.

Presently, centrifugal separation can be achieved by centrifuges of different design e.g. basket centrifuges, in which flocculants may be used. These machines act as filters through which the centrate is forced by centrifugal acceleration.

Another centrifugal separator used is the decanter whose products are improved by applying flocculants during decantation.

Other centrifugal devices may be constructed to perform similar operation e.g. a device in which centrifugal separation is effected by mechanical means, e.g. rotating impeller and an arrangement of stationary vanes for deflecting and the flocs and thereby causing them to substantially separate the flocs from the liquid.

Cyclones belong to the category of centrifugal separators. This invention relates to a method and apparatus for cyclonic separation of fine solids suspended in liquids. The principle involved is forming strong, compact flocs of such strength as to withstand the shear forces imposed on them in a centrifugal separator. This is achieved by flocculation in a flocculator which design depends on the two principles of quick dispersion of the flocculant in the suspension and mild agitation to promote growth of the floc size.

Cyclonic separators can be used for the stripping of solids from a effluent at greatly enhanced speed owing to centrifugal accelerations many times that of gravity, their small size in relation to capacity, low cost and the absence of moving parts.

Despite the above mentioned advantages, they are presently rarely used industrially for separating effluents containing particles of less than 10 micron equivalent diameter because, in order to separate such very fine particles from the liquid small-bore, long-tapered cyclones must be used, with their inherent disadvantages such as, frequent plugging and high maintenance.

For complete separation, a cyclone must have a size cut-point (d 50), well below the diameter of the finest particle in suspension. The size cutpoint is determined from known characteristics of the cyclone and is defined as the size of the largest flocs not substantially separated by the cyclone or, put another way, the size above which the flocs must be to be substantially separated by the cyclone.

The conventional solution for collecting the minus 10-microns particles is, to flocculate them and allow them to settle in "static" thickeners and clarifiers operating under gravity.

This permits low throughput capacity only and requires considerable space for the equipment. As well, the high cost and large size of conventional separators prevent their use in many instances. At the same time, the need for collecting colloidal material and ultra-fine particles of sub-micron size is increasing with the demand for clean water in all segments of society.

Special methods for collecting these particles, with their enormous specific surface area, are required to effectively settle certain pollutants of lakes and rivers, and the impalpable slimes often encountered in mineral processing and metallurgical plants. The principle of the invention is perhaps best described by the following simile: a strong wall is made by building it brick-by-brick rather than pouring a load of mortar on to a pile of bricks. In the same manner, small strong flocs are made by process of intensive, high-speed interspersion of the effluent and the flocculant, followed by a controlled floc growth.

In order to exploit the greater advantages of separating by means of cyclones it is essential to increase the particle size by flocculation, and increase the shear strength of the flocs to its maximum by a process that permits the most intimate bonding between the flocculant segments and the active sites on the particle surface to be established.

Flocculation is effectively achieved by means of long-chain flocculant molecules, in three steps; that are characterised by the following phenomena: (In this specification adsorption, bridging and entanglement are defined as follows:)

1. Adsorption: the attachment of a fraction of the total segments (functional groups) of a flocculant molecule on a fraction of the active sites on a particle surface. The remaining segments of the molecule will extend into the suspension.
2. bridging: the linking between two particles by the adsorption of particles on the extended remaining segments of the flocculant molecule or by the interaction between extended segments being adsorbed on different particles.
3. entanglement: the reinforcing and densifying of the formed floc by strengthening particle-to-particle bond within the floc by means of increasing the number of particle-to-flocculant attachement. Further strengthening is also achieved by mechanical entanglement of the flocculant filaments. This is done through mild agitation.

Floc strength is achieved by rapidly and throughly dispersing the flocculant in the suspension in such a way as to promote maximum bridging rather than excessive adsorption, that is rather than wrapping flocculant polymer around individual particles.

Floc size is determined by flocculant dosage and the time for floculation. Dosage in two or more stages increases the floc density and floc strength as it affords better control of the balance between bridging and adsorption or, put in a somewhat different way, the quality of the flocs are enhanced by repeating the interspersion — mild agitation cycle. Briefly summarised, the flocs thus formed permit the effluent to be effectively separated by cyclones — or slugging cyclones of commercial size.

It is an object of the present invention to provide a method and apparatus for centrifugally separating finely divided solids, from aqueous suspensions thereof, wherein the finely divided solids are flocculated to form dense, strong flocs which are predominantly larger than the "size cutpoint" of a cyclone separator, so that a major portion of the flocs may be separated by that cyclone separator.

According to the present invention there is provided a method of centrifugally separating finely divided solids from an aqueous suspension thereof, comprising:

a. forming a flowing sheet of the aqueous suspension with the finely divided solids having wetted surfaces from the aqueous medium, b. spraying a solution of a water soluble, high molecular weight, long chain flocculant substantially at right angles into a side face of the flowing sheet so that the flocculant is adsorbed onto the wetted surfaces of the finely divided solids without totally wrapping individual finely divided solids by the flocculant molecules and without entrapping finely divided solids by premature bridging by the flocculant molecules, c. flocculating the finely divided solids, by means of the water soluble flocculant adsorbed onto the wetted surfaces, to form dense, strong flocs, which are predominately larger than the size cutpoint of a cyclone separator, d. centrifugally separating a major portion of the dense, strong flocs from at least some of the aqueous medium by means of that cyclone separator.

Further, according to the present invention there is provided an apparatus for centrifugally separating finely divided solids from an aqueous suspension thereof, comprising a blender, a flocculator connected to the outlet of the blender, and a cyclone separator connected to the outlet of the flocculator, and wherein the blender comprises a cylindrical casing with an aqueous suspension inlet for directing aqueous suspension into the casing to form a rotating swirling hollow cone therein and an outlet for conveying the rotational flow substantially tangentially out of the casing and at a position spaced along the length of the casing from the inlet, an annular web secured inside the casing and extending radially inwardly between the inlet and outlet, a vortex finder disposed coaxially within the casing and sealed, at an intermediate web extending beyond the inlet and outlet, a flocculant solution nozzle in the casing and facing the end of the vortex finder extending beyond the outlet, the nozzle being shaped to direct a spray of flocculant solution substantially at right angles into the hollow cone of aqueous suspension in the vortex finder and passing from the inlet to the outlet.

Preferably the finely divided solids are flocculated to a size far greater than 10 microns.

Figure 2:
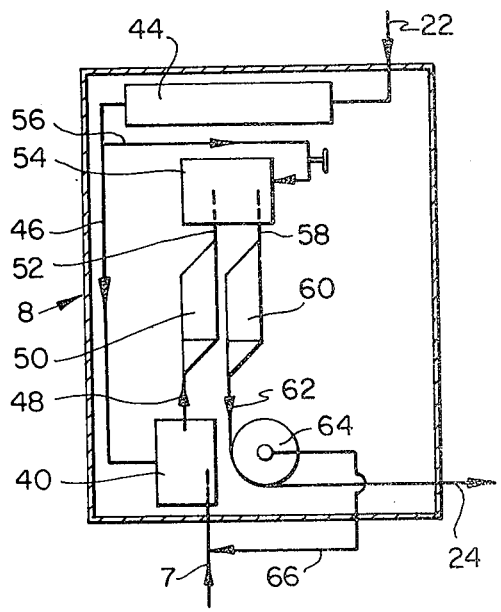
Figure 3:
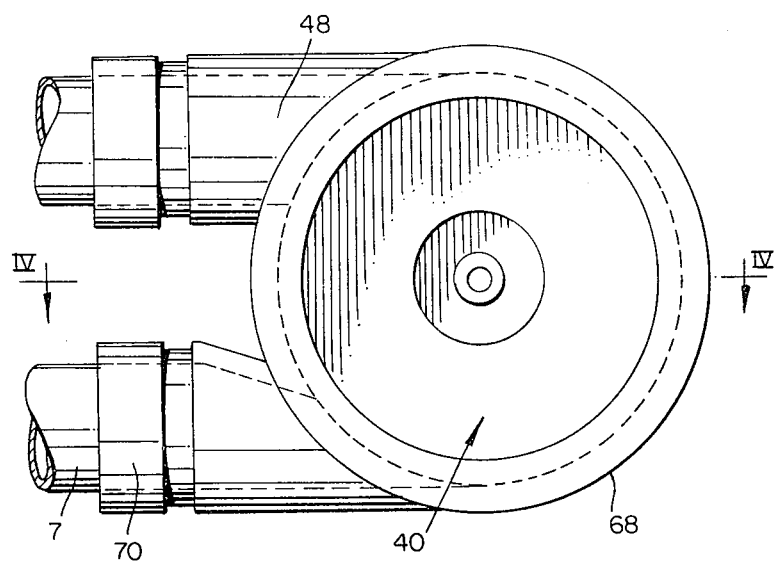
Figure 4:
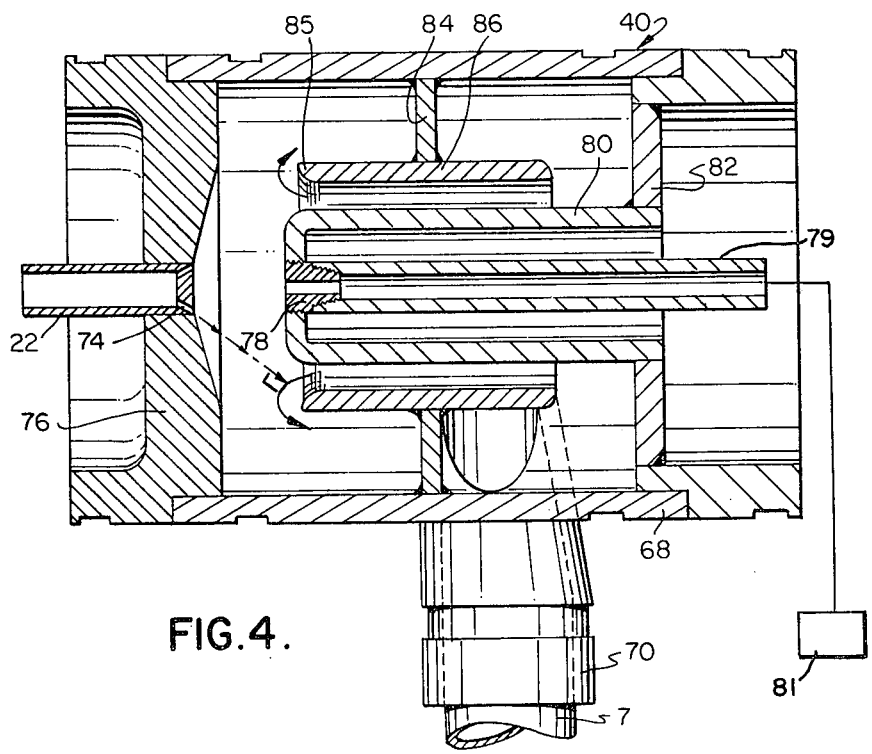

In the accompanying drawings which illustrate, by way of example, an embodiment of the present invention, FIG. 1 is a schematic view of an apparatus for separating finely divided solids from an aqueous suspension thereof, FIG. 2 is a schematic view of a flocculator, FIG. 3 is an enlarged plan view of a blender shown in FIG. 2 and FIG. 4 is a section side view along IV—IV, FIG. 3.

In FIG. 1 there is shown a storage container 1 for an aqueous suspension 2 of finely divided solids, having a suspension inlet 3 and outlet 4. A pump 6 is connected to the outlet 4 for delivering suspension, from the container 1, by pipe 7 to a flocculator 8.

A flocculant storage bin 10 is shown containing a water-soluble, high-molecular-weight, long chain flocculant 12 in powder form or as a thick liquid, and has a flocculant feeder outlet 14 for feeding flocculant solution outlet pipe 22 leading to the flocculator 8. The flocculator 8 has an outlet 24 leading to a cyclone separator 26 which has an outlet 28, for densified suspension, leading to a centrifugal separator 30. The cyclone separator 26 has another outlet 32, for separated water and remnants of flocs, leading to a second separator 34. The second cyclone separator 34 has an outlet 36, for densified suspension, leading to the centrifugal separator 30 and a clarified water outlet 38.

In FIG. 2 the flocculator is shown comprising a first cyclonic blender 40 connected to the aqueous suspension pipe 7 (FIG. 1) and the flocculant solution, pipe 22 via a booster pump 44 and inlet pipe 46. The cyclone blender 40 has an outlet 48 leading to a first flocculator pipe 50. The first flocculator pipe 50 has an outlet 52 leading to a second cyclone blender 54. The cyclone blender 54 has a flocculant solution inlet 56, branching off from pipe 46, and an outlet 58 leading to a second flocculator pipe 60.

The second flocculator pipe 60 has an outlet 62 leading to a pulp divider 64, the pulp divider returns undersize or very small flocs by pipe 66 to suspension inlet pipe 7, and passes flocculated suspension by outlet 24 to cyclone separator 26.

The cyclone blenders 40 and 54 are identical and so a description of the cyclone blender 40, shown in FIGS. 3 and 4 will also apply to the cyclone blender 54.

As shown in FIGS. 3 and 4 the cyclone blender 40 comprises a cylindrical casing 68 having a suspension inlet 70 connected to the pipe 7, (FIGS. 1 and 2), a spray nozzle assembly 74 connected to the flocculant solution pipe 22 and an air injection nozzle 78.

The spray nozzle assembly 74 is mounted in an end wall 76 of the casing 68, and the air injection nozzle 78 facing the spray nozzle assembly 74 is mounted by a tube 80 in a wall 82 of the casing 68 facing an annular web 84, and opposite the end wall 76. The annular web 84 is sealed around its outer edge to extend radially across the interior of the casing 68 at an intermediate position between the inlet 70 and outlet 48. The air injection nozzle 78 is connected by a tube 79 to a source 81 of pressurized air. A cylindrical, open ended vortex finder 86 is in the casing 68 and is coaxial within and sealed to the web 84 to extend, from each side thereof to positions, beyond the inlet 70 and outlet 48.

In operation aqueous suspension 2 (FIG. 1) from the container 1 is pumped by pump 6 through pipe 7 into the flocculator 8 whilst flocculant 12 is fed into the mixing tank 16, mixed with water from inlet 20 by agitator 18 and fed as a dilute solution to flocculator 8 by pipe 22.

The aqueous suspension passing along pipe 7 enters the blender casing 68 (FIG. 4) tangentially, rotating as a swirling hollow cylinder along the inner wall of vortex finder 86, and flowing around rim 85 of the vortex finder 86 as a swirling hollow cone to discharge from the casing 68 by the outlet 48, thus the aqueous suspension forms a thin flowing sheet in the casing 68. The flocculant solution from pipe 22 (FIG. 2) is pumped by pump 44 and sprayed by nozzle 74 (FIG. 4) as a hollow cone, substantially at right angles into the side of all of the flowing sheet of effluent flowing around the rim 85 so that flocculant and aqueous suspension are rapidly and intensively interspersed. Clearly, for the flocculant to be sprayed into the side face of the flowing sheet of effluent it is necessary for the kinetic energies of the flowing sheet flowing around the rim 85 and that of the sprayed flocculant to be matched. This rapid and intensive interspersion of the flocculant and aqueous suspension causes flocculant to be adsorbed onto the wetted surfaces of the finely divided solids, without totally wrapping individual finely divided solids by the flocculant molecules and without entrapping finely divided solids by premature bridging by the flocculant molecules. The shape of the swirling hollow cone leaving the rim 85 of the vortex finder 86 in the casing 68 is maintained by pressurizing air within the swirling hollow cone with air from the nozzle 78 so that the kinetic energies of the flocculant and that of the aqueous suspension are not dissipated by eddy currents and fluid masses that would otherwise tend to be in the way of the intersection of the sprayed hollow cone of flocculant and the swirling hollow cone of aqueous suspension which is fed within the swirling hollow cone into the hollow center thereof in the outwardly tapering direction of the swirling hollow cone.

The effluent, containing the finely divided solids with flocculant adsorbed on the wetted surfaces of finely divided solids leaves the casing 68 by outlet 48 (FIGS. 2 and 3) and passes to flocculator pipe 50 where the finely divided solids are flocculated by means of the flocculant adsorbed on to the wetted surfaces, to form dense, strong flocs which are larger than the size cutpoint of the cyclone separators 26 and 34.

The dense, strong flocs in aqueous medium pass from the flocculator pipe 50 into cyclone blender 54 where a swirling hollow cone is formed similar to that in cyclone blender 40 as further flocculant solution is sprayed substantially at right angles to a side face of the hollow cone so that further flocculant is adsorbed on to the wetted surfaces of the finely divided solids. The addition of further flocculant increases the average size of the dense, strong flocs already formed so that the dense, strong flocs are predominantly larger than the size cutpoint of the cyclone separators 26 and 34. Thus finely divided solids with further flocculant adsorbed on to the wetted surfaces and in the aqueous medium then pass from the cyclone blender 54 are of a size predominantly larger than the size cutpoint of the cyclone separators 26 and 34. The dense, strong flocs in aqueous medium, pass from the flocculator pipe 60 (FIG. 2) to the pulp divider 64 where undersize or very small flocs are returned to tank 1.

The dense, strong flocs, in aqueous medium, of the predetermined minimum size pass from the pulp divider 64 to the cyclone separator 26, where most of the flocs are separated and pass to the centrifugal separator 30. The aqueous medium containing some flocs passes from the cyclone clarifier 26 to the cyclone separator 34, where water separated from the flocs leaves by pipe 38 and the flocs are passed to the centrifugal separator 30. The centrifugal separator 30 extracts most of the remaining water from the flocs to leave then in the form of a moist cake.

In some embodiments of the present invention flocculant solution need only be sprayed once into the aqueous suspension and the suspension with flocculant adsorbed on to the wetted surfaces of the finely divided solids need only be flocculated once and centrifugally separated once.

In some cases the effluent is pre-conditioned either magnetically or by a coagulant before it enters the flocculator.

The following results were obtained using the apparatus shown in FIGS. 1 to 4.

TABLE I
CHARACTERISTICS OF EFFLUENTS AND CORRESPONDING FLOCCULANTS

| SAMPLE | Description | CHARACTERISTICS Fraction $-25\mu$ Wt. % | FLOCCULANT Trade Name | Manufacturer | Type | Charge | Optimum total dosage (lb/t.)* |
|---|---|---|---|---|---|---|---|
| I. Shaley Tailings | Coal washery flotation tailings (72.5% ash) pH: 7.6 | 74 | Superfloc 127 + Sepanan MG 200 | Cyanamid Dow | Polyacrylamide Polyacrylamide | Nonionic Anionic | 0.06 0.11 |
| II. Coal Product | Low ash (3.8%) high sulphur (2.7%) coal from Harbour Seam, N.S. pH: 7.8 | 59 | Nalcolyte 603 + Separan MG 200 | Alchem Dow | Polyamide Polyacrylamide | Cationic Anionic | 0.09 0.07 |
| III. Coal Product | High ash (20%), high sulphur (7.8%) Same origin as III. pH: 8.0 | 93 | Alum + Separan MG 200 | Canada Colors & Chemicals Dow | Al2(SO4)3 Polyacrylamide | Cationic Anionic | 0.10 0.08 |

*Pounds of flocculant (as commercially supplied) per ton of dry solids in the suspension.

TABLE II
EFFECT OF FLOCCULATION AND CYCLONING ON LOW ASH HIGH SULPHUR COAL FINES

| Size Range (microns) | Unflocculated Midpoint (microns) | Unflocculated Weight % Cum. | Unflocculated Weight % Slice | Flocculated feed to the cyclone Midpoint (microns) | Flocculated feed to the cyclone Weight % Cum. | Flocculated feed to the cyclone Weight % Slice | Reconstituted sample after cycloning Midpoint (microns) | Reconstituted sample after cycloning Weight % Cum. | Reconstituted sample after cycloning Weight % Slice |
|---|---|---|---|---|---|---|---|---|---|
| Plus 250 | — | — | — | 262.5 | 100.0 | 7.5 | 262.5 | 100.0 | 2.5 |
| 225 × 250 | — | — | — | 237.5 | 92.5 | 1.4 | 237.5 | 97.5 | 1.5 |
| 200 × 225 | — | — | — | 212.5 | 91.1 | 3.9 | 212.5 | 96.0 | 2.0 |
| 175 × 200 | — | — | — | 187.5 | 87.2 | 4.8 | 187.5 | 94.0 | 3.5 |
| 150 × 175 | — | — | — | 162.5 | 82.4 | 6.7 | 162.5 | 90.5 | 4.8 |
| 125 × 150 | — | — | — | 137.5 | 75.7 | 11.4 | 137.5 | 85.7 | 7.7 |
| 100 × 125 | — | — | — | 112.5 | 64.3 | 30.4 | 112.5 | 78.0 | 20.6 |
| 75 × 100 | — | — | — | 87.5 | 33.9 | 19.3 | 87.5 | 57.4 | 26.7 |
| 50 × 75 | — | — | — | 62.5 | 14.6 | 8.8 | 62.5 | 30.7 | 30.7 |
| 45 × 50 | 47.5 | 100.0 | 7.2 | | | | | | |
| 40 × 45 | 42.5 | 92.8 | 5.3 | | | | | | |
| 35 × 40 | 37.5 | 87.5 | 11.8 | | | | | | |
| 30 × 35 | 32.5 | 75.7 | 16.5 | | | | | | |
| 25 × 30 | 27.5 | 59.2 | 30.8 | ↓ 5.8 | ↓ 5.8 | | ↓ 11.0 | ↓ 11.0 | |
| 20 × 25 | 22.5 | 28.4 | 8.9 | | | | | | |
| 15 × 20 | 17.5 | 19.5 | 3.6 | | | | | | |
| 10 × 15 | 12.5 | 15.9 | 2.8 | | | | | | |
| 5 × 10 | 7.5 | 13.1 | 1.6 | | | | | | |
| −5 | 2.5 | 11.5 | 11.5 | | | | | | |
| | Mean: | 27.3 | | Mean: | 124.9 | | Mean: | 101.8 | |
| | Variance: | 148.5 | | Variance: | 3470.6 | | Variance: | 2639.4 | |
| | Std. Dev.: | 12.2 | | Std. Dev.: | 58.9 | | Std. Dev.: | 51.4 | |

TABLE III

EFFECT OF FLOCCULATION AND CYCLONING ON A HIGH ASH HIGH SULPHUR COAL

| Size Range | Unflocculated | | | Flocculated feed to the cyclone | | | Reconstituted sample after cycloning | | |
|---|---|---|---|---|---|---|---|---|---|
| (microns) | Midpoint (microns) | Weight % Cum. | Slice | Midpoint (microns) | Weight % Cum. | Slice | Midpoint (microns) | Weight % Cum. | Slice |
| Plus 250 | — | — | — | 262.5 | 100.0 | 7.5 | 262.5 | 100.0 | 1.5 |
| 225 × 250 | — | — | — | 237.5 | 92.5 | 3.4 | 237.5 | 98.5 | 2.5 |
| 220 × 225 | — | — | — | 212.5 | 89.1 | 4.0 | 212.5 | 96.0 | 3.0 |
| 175 × 200 | — | — | — | 187.5 | 85.1 | 5.1 | 187.5 | 93.0 | 5.0 |
| 150 × 175 | — | — | — | 162.5 | 80.0 | 6.0 | 162.5 | 88.0 | 6.5 |
| 125 × 150 | — | — | — | 137.5 | 74.0 | 10.0 | 137.5 | 81.5 | 9.0 |
| 100 × 125 | — | — | — | 112.5 | 64.0 | 29.0 | 112.5 | 72.5 | 17.5 |
| 75 × 100 | — | — | — | 87.5 | 35.0 | 19.5 | 87.5 | 55.0 | 27.0 |
| 50 × 75 | — | — | — | 62.5 | 15.5 | 12.7 | 62.5 | 28.0 | 21.0 |
| 45 × 50 | — | — | — | ↑ | ↑ | ↑ | ↑ | ↑ | ↑ |
| 40 × 45 | 42.5 | 100.0 | 0.5 | | | | | | |
| 35 × 40 | 37.5 | 99.5 | 2.0 | | | | | | |
| 30 × 35 | 32.5 | 97.5 | 4.9 | | | | | | |
| 25 × 30 | 27.5 | 92.6 | 12.3 | | 2.8 | 2.8 | | 7.0 | 7.0 |
| 20 × 25 | 22.5 | 80.3 | 24.6 | | | | | | |
| 15 × 20 | 17.5 | 55.7 | 32.1 | | | | | | |
| 10 × 15 | 12.5 | 23.6 | 6.1 | | | | | | |
| 5 × 10 | 7.5 | 17.5 | 2.3 | | | | | | |
| −5 | 2.5 | 15.2 | 15.2 | | | | | | |
| | Mean: | 18.4 | | Mean: | 127.6 | | Mean: | 107.1 | |
| | Variance: | 78.6 | | Variance: | 3578.1 | | Variance | 2701.2 | |
| | Std. Dev.: | 8.9 | | Std. Dev.: | 59.8 | | Std. Dev.: | 52.0 | |

TABLE IV

EFFECT OF FLOCCULATION AND CYCLONING ON A COAL WASHERY FLOTATION TAILINGS

| Size Range | Unflocculated | | | Flocculated feed to the cyclone | | | Reconstituted sample after cycloning | | |
|---|---|---|---|---|---|---|---|---|---|
| (microns) | Midpoint (microns) | Weight % Cum. | Slice | Midpoint (microns) | Weight % Cum. | Slice | Midpoint (microns) | Weight % Cum. | Slice |
| Plus 250 | — | — | — | 262.5 | 100.0 | 2.9 | 262.5 | 100.0 | 2.0 |
| 225 × 250 | — | — | — | 237.5 | 97.1 | 1.8 | 237.5 | 98.0 | 0.5 |
| 200 × 225 | — | — | — | 212.5 | 95.3 | 2.3 | 212.5 | 97.5 | 1.5 |
| 175 × 200 | — | — | — | 187.5 | 93.0 | 6.5 | 187.5 | 96.0 | 4.5 |
| 150 × 175 | — | — | — | 162.5 | 86.5 | 11.6 | 162.5 | 91.5 | 7.5 |
| 125 × 150 | — | — | — | 137.5 | 74.9 | 19.4 | 137.5 | 84.0 | 15.8 |
| 100 × 125 | — | — | — | 112.5 | 55.5 | 25.4 | 112.5 | 68.2 | 19.2 |
| 75 × 100 | — | — | — | 87.5 | 30.1 | 21.1 | 87.5 | 49.0 | 24.8 |
| 50 × 75 | — | — | — | 62.5 | 9.0 | 7.5 | 62.5 | 24.2 | 17.2 |
| 45 × 50 | — | — | — | ↑ | ↑ | ↑ | ↑ | ↑ | ↑ |
| 40 × 45 | 42.5 | 100.0 | 5.4 | | | | | | |
| 35 × 40 | 37.5 | 94.6 | 8.4 | | | | | | |
| 30 × 35 | 32.5 | 86.2 | 12.1 | | | | | | |
| 25 × 30 | 27.5 | 74.1 | 46.5 | | 1.5 | 1.5 | | 7.0 | 7.0 |
| 20 × 25 | 22.5 | 27.6 | 15.6 | | | | | | |
| 15 × 20 | 17.5 | 12.0 | 2.9 | | | | | | |
| 10 × 15 | 12.5 | 9.1 | 2.7 | | | | | | |
| 5 × 10 | 7.5 | 6.4 | 2.4 | | | | | | |
| −5 | 2.5 | 4.0 | 4.0 | | | | | | |
| | Mean: | 26.8 | | Mean: | 126.6 | | Mean: | 108.2 | |
| | Variance: | 71.3 | | Variance: | 2198.4 | | Variance: | 2287.7 | |
| | Std. Dev.: | 8.4 | | Std. Dev.: | 46.9 | | Std. Dev.: | 47.8 | |

TABLE V

CHARACTERISTICS OF EFFLUENTS AND CORRESPONDING FLOCCULANTS

| SAMPLE | CHARACTERISTICS | | | FLOCCULANT | | | |
|---|---|---|---|---|---|---|---|
| | Description | Fraction −25 Wt. % | Trade name | Manufacturer | Type | Charge | Optimum total dosage (lb/t.)* |
| I. Iron Oxide | Effluent from blast furnace clarifiers of a basic oxygen steel making dust, pH: 11 | 99 | Super-floc 127 | Cyanamid | Polyacrylamide | Non-ionic | 0.20 |

*Pounds of flocculant (as commercially supplied) per ton of dry solids in the suspension.

TABLE VI

EFFECT OF FLOCCULATION AND CYCLONING ON IRON OXIDE EFFLUENT*

| Size Range (microns) | Unflocculated Midpoint (microns) | Unflocculated Weight % Cum. | Unflocculated Weight % Slice | Flocculated feed to the cyclone Midpoint (microns) | Flocculated feed Weight % Cum. | Flocculated feed Weight % Slice | Reconstituted sample after cycloning Midpoint (microns) | Reconstituted Weight % Cum. | Reconstituted Weight % Slice |
|---|---|---|---|---|---|---|---|---|---|
| Plus 400 | — | — | — | 425 | 100.0 | 6.5 | 425 | 100.0 | 4.8 |
| 350 × 400 | — | — | — | 375 | 93.5 | 5.4 | 375 | 95.2 | 2.0 |
| 300 × 350 | — | — | — | 325 | 88.1 | 8.0 | 325 | 93.2 | 6.1 |
| 250 × 300 | — | — | — | 275 | 80.1 | 13.2 | 275 | 87.1 | 9.9 |
| 150 × 200 | — | — | — | 225 | 66.9 | 17.9 | 225 | 77.2 | 14.7 |
| 100 × 150 | — | — | — | 175 | 49.0 | 30.5 | 175 | 62.5 | 20.0 |
| 50 × 100 | — | — | — | 125 | 18.5 | 16.5 | 125 | 42.5 | 22.0 |
| 45 × 50 | — | — | — | | | | 75 | 20.5 | 17.0 |
| 40 × 45 | 42.5 | 100.0 | 0.8 | | | | | | |
| 35 × 40 | 37.5 | 99.2 | 0.3 | | | | | | |
| 30 × 35 | 32.5 | 98.9 | 0.5 | 0.2 | 0.2 | | | | |
| 25 × 30 | 27.5 | 98.4 | 0.9 | | | | | | |
| 20 × 25 | 22.5 | 97.5 | 2.5 | | | | | | |
| 15 × 20 | 17.5 | 95.0 | 12.0 | | | | 3.5 | 3.5 | |
| 10 × 15 | 12.5 | 83.0 | 23.0 | | | | | | |
| 5 × 10 | 7.5 | 60.0 | 42.0 | | | | | | |
| −5 | 2.5 | 18.0 | 18.0 | | | | | | |
| Mean: | | 10.0 | | Mean: | 225.4 | | Mean: | 184.2 | |
| Variance: | | 41.3 | | Variance: | 8050.3 | | Variance: | 9579.6 | |
| Std. Dev.: | | 6.4 | | Std. Dev.: | 89.7 | | Std. Dev.: | 97.9 | |

*Origin: Clarifiers of basic oxygen steelmaking dust.

TABLE VII

PERFORMANCE EVALUATION OF 12-IN. CL. C. ON FLOCCULATED IRON OXIDE

| Size fraction (microns) | Fraction PN | Weight % slice | Recovery of solids in the underflow (U) (2)%× (3) | Solids reporting to overflow (O) (3)%− (4) | Overflow recirculated Recovery of solids in underflow OU 2nd stage (2) × (5) | Total recovery on the underflow U + OU (4) + (6) |
|---|---|---|---|---|---|---|
| 0 – 25 | 0.12 | — | — | — | — | — |
| 25 – 50 | 0.21 | — | — | — | — | — |
| 50 – 75 | 0.43 | — | — | — | — | — |
| 75 – 100 | 0.67 | 2.0 | 1.34 | 0.66 | 0.44 | 1.78 |
| 100 – 125 | 0.77 | 7.0 | 5.39 | 1.61 | 1.24 | 6.63 |
| 125 – 150 | 0.87 | 9.5 | 8.27 | 1.23 | 1.07 | 9.34 |
| 150 – 175 | 0.93 | 16.5 | 15.35 | 1.15 | 1.07 | 16.42 |
| 175 – 200 | 0.97 | 19.0 | 18.43 | 0.57 | 0.55 | 18.98 |
| 200 – 225 | 1.00 | 11.5 | 11.50 | — | — | 11.50 |
| 225 – 250 | 1.00 | 9.0 | 9.00 | — | — | 9.00 |
| 250 – 275 | 1.00 | 9.0 | 9.00 | — | — | 7.00 |
| 275 – 300 | 1.00 | 6.5 | 6.50 | — | — | 6.50 |
| 300 – 325 | 1.00 | 3.5 | 3.50 | — | — | 3.50 |
| 325 – 350 | 1.00 | 2.5 | 2.50 | — | — | 2.50 |
| 350 – 375 | 1.00 | 2.0 | 2.00 | — | — | 2.00 |
| 375 – 400 | 1.00 | 1.5 | 1.50 | — | — | 1.50 |
| + 400 | 1.00 | 2.5 | 2.50 | — | — | 2.50 |
| TOTAL | | 100.0 | 94.78 | 5.22 | 4.37 | 99.15 |

We claim:

1. A method of centrifugally separating finely divided solids from an aqueous suspension thereof, comprising:
   a. feeding the aqueous suspension substantially tangentially into a cylindrical casing of a blender and swirling the aqueous suspension in a cylindrical, open ended vortex finder in the cylindrical casing to form, as a thin flowing sheet of the aqueous suspension with the finely divided solids having wetted surfaces from the aqueous medium, a swirling hollow cone in the vortex finder flowing around a rim of the vortex finder,
   b. spraying, as a conical spray, a solution of a water soluble, high molecular weight long chain flocculant substantially at right angles, with the kinetic energies of sprayed flocculant and that of flowing sheet flowing around the rim of the vortex finder matched, towards a side face of all of the portion of the flowing sheet flowing around the rim of the vortex finder so that the flocculant is sprayed into the flowing sheet flowing around the rim of the vortex finder and the flocculant and aqueous suspension are rapidly and intensively interspersed and the flocculant is adsorbed onto the wetted surfaces of the finely divided solids without totally wrapping individual finely divided solids by the flocculant molecules and without entrapping finely divided solids by premature bridging by the flocculant molecules,
   c. maintaining the shape of the swirling hollow cone by pressurizing air within the swirling hollow cone with air from a nozzle which is fed within the swirling hollow cone into the hollow center thereof in the outwardly tapering direction of the swirling hollow cone so that the kinetic energies of the flocculant and that of the aqueous suspension are not dissipated by eddy currents and fluid masses that would otherwise tend to be in the way of the intersection of the sprayed flocculant and the swirling hollow cone, d. feeding the aqueous suspension, with the said flocculant adsorbed onto the said wetted surfaces of the finely divided solids, from the blender to a flocculator and flocculating the finely divided solids, by means of the water soluble flocculant adsorbed onto the wetted surfaces, to form dense, strong flocs, which are predominantly large enough to be substantially separated from the aqueous medium by a cyclone separator, and e. feeding the dense, strong flocs and aqueous medium to a cyclone separator and centrifugally separating a major portion of the dense, strong flocs from at least some of the aqueous medium by means of that cyclone separator.

2. A method according to claim 1, wherein after flocculating the finely divided solids, by means of the water soluble flocculant adsorbed onto the wetted surfaces, the flocculated finely divided solids thus formed and the aqueous medium are fed substantially tangentially into the cylindrical casing of a second blender and swirled in a cylindrical, open ended, vortex finder in the cylindrical casing of the second blender, to form, as a thin flowing sheet of the aqueous suspension and flocculated finely divided solids, a swirling hollow cone in the vortex finder of the second blender, flowing around the rim of that vortex finder, a further solution of a water soluble, high molecular weight, long chain flocculant is sprayed substantially at right angles onto a side face of all of the portion of the flowing sheet of the flocculated finely divided solids in aqueous medium flowing around the rim of the vortex finder in the second blender so that further flocculant and aqueous medium are rapidly and intensively interspersed and the flocculant is adsorbed onto the wetted surfaces of the finely divided solids, maintaining the shape of the swirling hollow cone in the second blender by pressurizing air within the swirling hollow cone with air from a nozzle, the finely divided solids are then flocculated a second time, by means of the further flocculant adsorbed on to the wetted surfaces to form dense, strong flocs which are predominantly large enough to be separated from the aqueous medium by the centrifugal separator, and are then centrifugally separated from some of the aqueous medium by the centrifugal separator.

3. A method according to claim 1, wherein flocs of a size greater than 10 microns are centrifugally separated from the aqueous medium by the cyclone separator.

4. A method according to claim 3, wherein the flocs of a size greater than 10 microns are separated in two cyclone separators, with the inlet of the second cyclone separator receiving the flocs in aqueous medium which has not been removed from the effluent in the first of the two cyclone separators and the dense, strong flocs from both cyclone separators are fed to a centrifugal separator and centrifugally separated therein from aqueous medium that has not been removed in the cyclone separators.

5. An apparatus for centrifugally separating finely divided solids from an aqueous suspension thereof, comprising a blender, a flocculator connected to the outlet of the blender, and a cyclone separator connected to the outlet of the flocculator, and wherein the blender comprises a cylindrical casing with a substantially tangential, aqueous suspension inlet, for directing aqueous suspension substantially tangentially into the casing to form a rotating, swirling hollow cone therein, and a substantially tangential outlet, for conveying the rotational flow substantially tangentially out of the casing and at a position spaced along the length of the casing from the inlet, an annular web secured inside the casing and sealed thereto and extending radially inwardly at an intermediate position between the inlet and outlet, a cylindrical, open ended, vortex finder disposed coaxially within the casing and sealed, at an intermediate position along its length, in the annular web, the vortex finder extending from each side of the annular web to positions beyond the inlet and outlet, a flocculant solution nozzle mounted in an end wall of the casing and facing the end of the vortex finder at a position beyond the outlet, the flocculant solution nozzle being shaped to direct a conical spray of flocculant solution substantially at right angles into the hollow cone of aqueous suspension in the vortex finder, and passing from the inlet to the outlet, as it passes around a rim of the vortex finder, an air nozzle coaxially disposed in the vortex finder and facing the flocculant solution nozzle for directing pressurizing air within the swirling hollow cone of the aqueous suspension and the conical spray of flocculant, a tube extending along the interior of the vortex finder and mounting the air nozzle to an opposite end wall of the casing to that in which the flocculant nozzle is mounted, and a source of pressurized air connected to the